(12) United States Patent
Onodera

(10) Patent No.: US 10,598,235 B2
(45) Date of Patent: Mar. 24, 2020

(54) FRICTION BRAKE STRUCTURE

(71) Applicant: ORIENTAL MOTOR CO., LTD., Tokyo (JP)

(72) Inventor: Atsushi Onodera, Ibaraki (JP)

(73) Assignee: Oriental Motor Co., Ltd., Tokyo (JP)

( * ) Notice: Subject to any disclaimer, the term of this patent is extended or adjusted under 35 U.S.C. 154(b) by 305 days.

(21) Appl. No.: 15/539,842

(22) PCT Filed: Dec. 21, 2015

(86) PCT No.: PCT/JP2015/085699
§ 371 (c)(1),
(2) Date: Jun. 26, 2017

(87) PCT Pub. No.: WO2016/104438
PCT Pub. Date: Jun. 30, 2016

(65) Prior Publication Data
US 2017/0370429 A1 Dec. 28, 2017

(30) Foreign Application Priority Data

Dec. 26, 2014 (JP) .................................. 2014-265847

(51) Int. Cl.
*F16D 55/02* (2006.01)
*F16D 55/08* (2006.01)
(Continued)

(52) U.S. Cl.
CPC ......... *F16D 65/0971* (2013.01); *F16D 55/02* (2013.01); *H02K 7/102* (2013.01)

(58) Field of Classification Search
CPC .......... H02K 7/102; H02K 7/10; H02K 7/108; H02K 7/112; F16D 55/02; F16D 65/0971;
(Continued)

(56) References Cited

U.S. PATENT DOCUMENTS 3,667,578 A * 6/1972 Johnson .................... F16B 1/04
192/223.3
3,763,968 A * 10/1973 Noly ....................... F16D 55/02
188/171
(Continued)

FOREIGN PATENT DOCUMENTS

CA 2112609 A1 * 7/1995 ............. F16D 67/02
DE 12 43 926 B 7/1967
(Continued)

OTHER PUBLICATIONS

English Translation for Written Opinion for corresponding International Application No. PCT/JP2015/085699, dated Mar. 22, 2016, 5 pages.
(Continued)

*Primary Examiner* — Edgardo San Martin
(74) *Attorney, Agent, or Firm* — Alston & Bird LLP

(57) ABSTRACT

To reduce abnormal noise production in a friction brake structure, the friction brake structure includes: a brake plate (20) fixed to a rotating shaft (15) of a rotary electric machine (1); a ring-shaped brake shoe (30) disposed facing the brake plate; and a brake shoe support plate (40) which engages with a fixing portion of the rotary electric machine so as to be movable in an axial direction, and which supports the brake shoe and is biased by biasing action so as to bring the brake shoe into sliding contact with the brake plate.

7 Claims, 3 Drawing Sheets

(51) Int. Cl.
*H02K 7/102* (2006.01)
*F16D 65/097* (2006.01)
*H02K 7/10* (2006.01)

(58) Field of Classification Search
CPC .......... F16D 55/08; F16D 55/16; F16D 55/22; F16D 55/225; F16D 55/224; F16D 55/28; F16D 59/02
See application file for complete search history.

(56) References Cited

U.S. PATENT DOCUMENTS

| | | | |
|---|---|---|---|
| 4,684,838 A | | 8/1987 | Casanova |
| 5,529,157 A | * | 6/1996 | Desrochers ............. F16D 67/02 192/16 |
| 5,967,272 A | | 10/1999 | Reynolds |
| 6,668,982 B2 | * | 12/2003 | LaGarde ................. F16D 55/22 188/171 |
| 8,820,489 B2 | * | 9/2014 | Ritchie ................. F16D 65/186 188/161 |
| 10,001,188 B2 | * | 6/2018 | Defosse ................. F16D 41/02 |

FOREIGN PATENT DOCUMENTS

| | | |
|---|---|---|
| DE | 26 25 990 A1 | 12/1977 |
| EP | 0 209 943 A1 | 1/1987 |
| EP | 1 178 588 A2 | 2/2002 |
| JP | S 55-135237 | 10/1980 |
| JP | S 56-109934 | 8/1981 |
| JP | S 58-7935 | 1/1983 |
| JP | S 59-186535 | 12/1984 |
| JP | H09-40339 | 2/1997 |
| JP | H11-089173 | 3/1999 |
| WO | WO-9748176 A1 * 12/1997 ............. F16D 55/02 |

OTHER PUBLICATIONS

Office Action for corresponding Japanese Application No. 2014-265847 dated Dec. 26, 2017 with English Translation, 5 pages.
International Search Report and Written Opinion for corresponding International Application No. PCT/JP2015/085699, dated Mar. 22, 2016, 10 pages.
Extended European Search Report for corresponding European Application No. 15873006.9 dated Oct. 19, 2018, 8 pages.

* cited by examiner

FRICTION BRAKE STRUCTURE

CROSS-REFERENCE TO RELATED APPLICATIONS

This application is a national stage application filed under 35 U.S.C. 371 of International Application No. PCT/JP2015/085699, filed Dec. 21, 2015, which claims priority from Japanese Patent Application No. 2014-265847, filed Dec. 26, 2014, each of which is incorporated by reference herein in its entirety.

BACKGROUND OF THE INVENTION

Technical Field

The present invention relates to a friction brake structure for a rotary electric machine such as a motor.

Background Art

FIG. 6 shows a conventional friction brake structure for a motor. The motor includes a motor case 100, a stator 101, and a rotor 102, and the stator 101 and the rotor 102 are provided in the motor case 100. The rotor 102 is supported by a rotating shaft 103. The rotating shaft 103 is supported on an output-side bearing 106a and an opposite-to-output-side bearing 106b. A brake plate 104 is fixed to the rotating shaft 103. A plurality of brake shoes 105 are disposed so as to face the brake plate 104. The brake shoes 105 are inserted into holes 108 drilled in a bearing housing portion 107 in the axial direction. The opposite-to-output-side bearing 106b is mounted in the bearing housing portion 107. Each brake shoe 105 is biased toward the brake plate 104 by a coil spring 109 so as to be in sliding contact with the brake plate 104. The coil spring 109 is supported by a spring retainer plate 110.

In the friction brake structure as described above, the sliding contact of the brake shoes 105 on the brake plate 104 provides braking action as well as holding torque when the motor stops.

Patent Literature 1 discloses fixing, to a ring-shaped support, a plurality of brake shoes as described above.

CITATION LIST

Patent Literature

Patent Literature 1: JP H11-089173 A

SUMMARY OF INVENTION

Technical Problem

In such a conventional friction brake structure, the brake shoes rotate along with the rotation of the brake plate, and such rotation might produce abnormal noises called brake squeal.

In view of the problem described above, the present invention has an object to reduce abnormal noise production in a friction brake structure.

Solution to Problem

To achieve the above object, an embodiment of the present invention provides a friction brake structure including: a brake plate fixed to a rotating shaft of a rotary electric machine; a ring-shaped brake shoe disposed facing the brake plate; and a brake shoe support plate which engages with a fixing portion of the rotary electric machine so as to be movable in an axial direction, and which supports the brake shoe while being biased by biasing action so as to bring the brake shoe into sliding contact with the brake plate.

A configuration may be employed in which a protrusion is provided in either one of a surface of the brake shoe opposite to a sliding contact surface with the brake plate, and a support surface of the brake shoe support plate, and an engaging portion for engaging with the protrusion is provided in the other one.

The brake plate may be fixed to the rotating shaft at a location outside the opposite-to-output-side bearing for supporting the rotating shaft.

An outside diameter of the brake plate may be smaller than an outside diameter of the opposite-to-output-side bearing, and the brake plate may be supported on an inner ring portion of the opposite-to-output-side bearing.

An outside diameter of the brake shoe may be smaller than an outside diameter of the opposite-to-output-side bearing The friction brake structure may further include a conical coil spring as a mechanism for applying the biasing action to the brake shoe support plate.

The friction brake structure may further include a contact stop portion for restricting movement of the brake shoe support plate in the axial direction toward the brake plate, the movement occurring when an axial thickness of the brake shoe reduces below a predetermined value.

Advantageous Effects of Invention

As described above, the friction brake structure according to an embodiment of the present invention includes a brake plate fixed to a rotating shaft of a rotary electric machine; a ring-shaped brake shoe disposed facing the brake plate; and a brake shoe support plate which engages with a fixing portion of the rotary electric machine so as to be movable in an axial direction, and which supports the brake shoe while being biased by biasing action so as to bring the brake shoe into sliding contact with the brake plate.

Bringing the ring-shaped brake shoe into sliding contact with the brake plate while preventing the brake shoe from rotating together with the brake plate reduces a rotational moment caused by a friction force of the brake shoe, and thereby makes the spring constant of the coupled portion between the brake shoe and the brake plate less liable to change. As a result, self-excited oscillation of the brake shoe is suppressed, and thus production of abnormal noises called brake squeal can be reduced.

BRIEF DESCRIPTION OF DRAWINGS

FIG. 2A shows the coupled system while the brake shoes are not rotating; and FIG. 2B shows the coupled system while the brake shoes are rotating.

DESCRIPTION OF EMBODIMENTS

[Mechanisms of Abnormal Noise Production]

First of all, the inventor made a study on mechanisms of abnormal noise production, which will be described in detail below.

Figure 1:
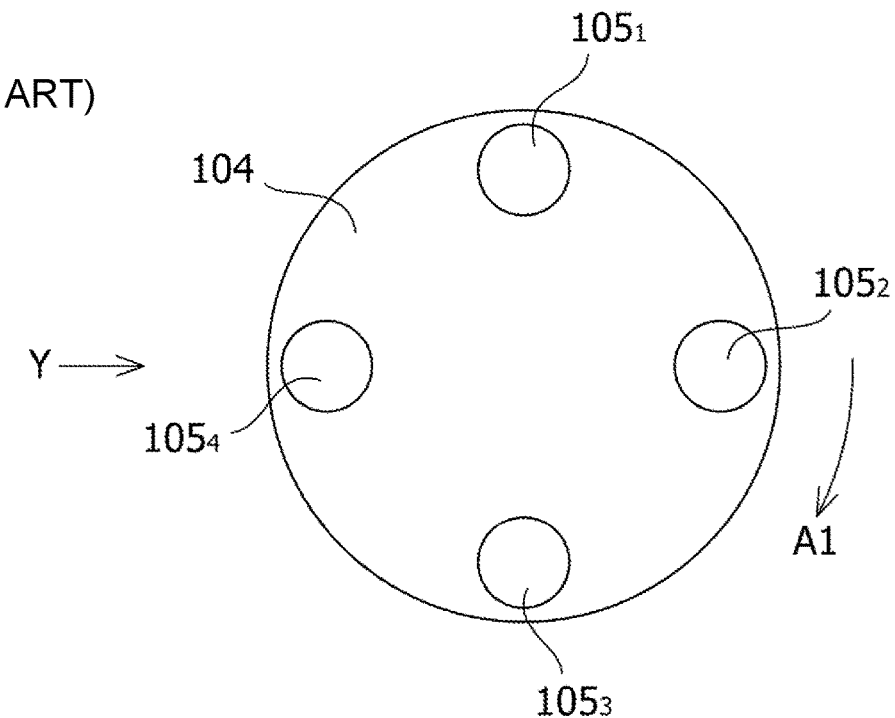
FIG. 1 is a view as viewed from an opposite-to-output side of a motor illustrating how a brake plate and brake shoes are arranged.
Figure 6:
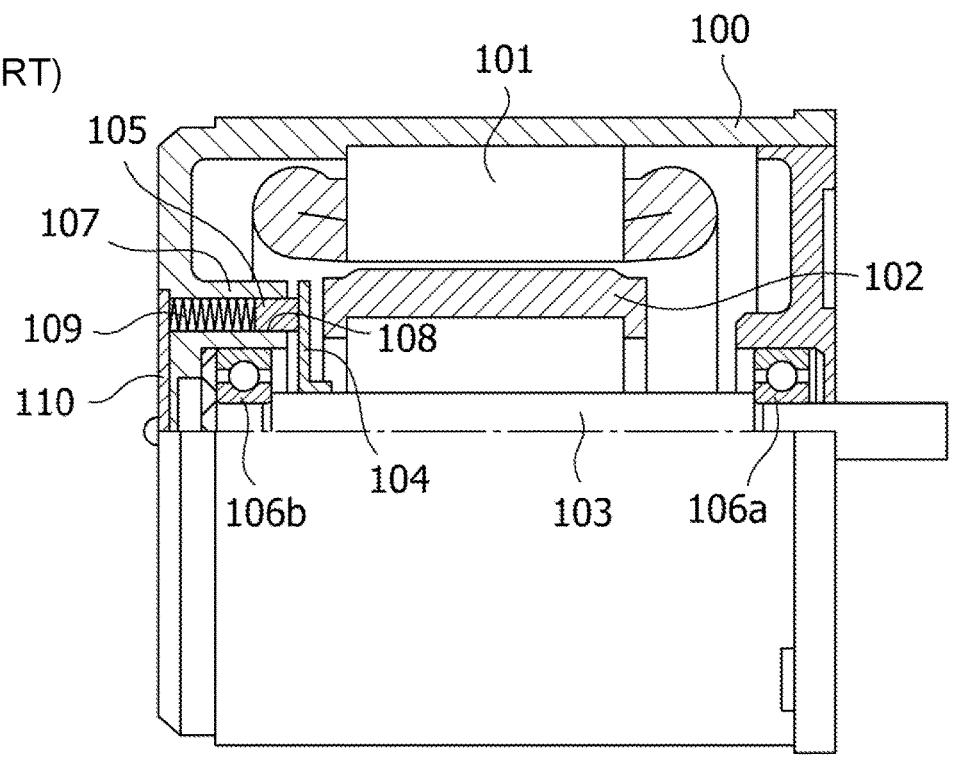
FIG. 6 is a cross-sectional view of a conventional friction brake structure for a motor.

FIG. 1 is a view illustrating the brake plate 104 and the plurality of brake shoes 105 in the motor shown in FIG. 6 as viewed from the opposite-to-output side of the motor. In FIG. 1, the four brake shoes 105, which are provided in the circumferential direction at even intervals, are denoted by the reference numerals $105_1$ to $105_4$ so as to be distinguishable from one another. The rotation direction of the brake plate 104 is indicated by arrow A1.

Figure 2A:
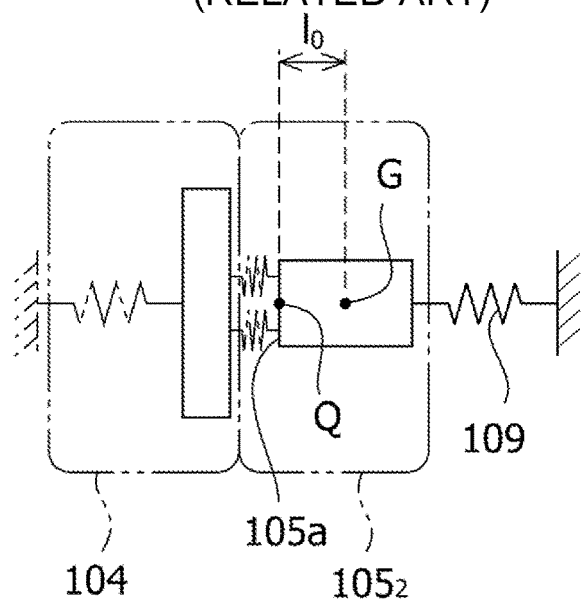
FIGS. 2A and 2B illustrate a coupled system in a friction brake structure.
Figure 2B:
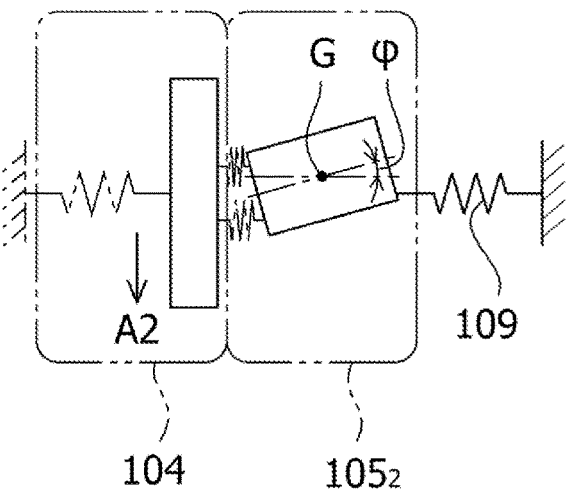

Abnormal noise production in a friction brake structure is a kind of self-excited oscillation in a coupled system. FIGS. 2A and 2B each show the coupled system including a portion of the brake plate 104, the brake shoe $105_2$, and the coil spring 109 as viewed from the direction indicated by arrow Y of FIG. 1. The elasticity, mass, and position of the brake plate 104 in FIGS. 2A and 2B are represented by $k_B$, $m_B$, and $x_B$, respectively. Also, the elasticity, mass, and position of the brake shoe $105_2$ in FIGS. 2A and 2B are represented by k, $m_S$, and $x_S$, respectively. The elasticity of the coil spring 109 is represented by $k_s$. In FIG. 2B, $\varphi$ indicates an inclination angle of the brake shoe $105_2$ observed when the portion of the brake plate 104 has moved in the direction of arrow A2 as a result of the rotation of the brake plate 104. The moment of inertia of the brake shoe $105_2$ is represented by $J_S$. The friction coefficient between the brake plate 104 and the brake shoe $105_2$ is represented by $\mu$. The distance from the center of gravity G of the brake shoe $105_2$ to the sliding contact surface 105a is represented by $l_0$, and time is represented by t. The contact area between the brake plate 104 and the brake shoe $105_2$ is represented by A, and the spring constant related to the rotation around the center of gravity G of the brake shoe $105_2$ is represented by $k_\varphi$. In the vicinity of the equilibrium point, these quantities have the following relationships:

$$m_B \frac{d^2 x_B}{dt^2} = -k_B x_B - \int f(l)dA \quad (1)$$

$$m_S \frac{d^2 x_S}{dt^2} = -k_S x_S + \int f(l)dA \quad (2)$$

$$J_S \frac{d^2 \varphi}{dt^2} = -k_\varphi \varphi + \mu l_0 \int f(l)dA + \int f(l)dA \quad (3)$$

Equation (1) is the equation of motion for the position of the brake plate. Equation (2) is the equation of motion for the position of the brake shoe. Equation (3) is the equation of motion for the rotation of the brake shoe.

Here, the integrand f(l) is a function expressing the pressure between the brake plate 104 and the brake shoe $105_2$, in which l represents the coordinates on the sliding contact surface $105_a$ in the case in which the point of intersection Q between the axis of the brake shoe $105_2$ and the sliding contact surface $105_a$ is used as a reference point. The integrand f(l) can be approximated as follows:

$$f(l) = k(x_B - x_S - l\varphi)$$

Combining the above equations gives the following simultaneous equations:

$$\begin{cases} m_B \frac{d^2 x_B}{dt^2} = -k_B x_B - \int k(x_B - x_S - l\varphi)dA & (4) \\ m_S \frac{d^2 x_S}{dt^2} = -k_S x_S - \int k(x_B - x_S - l\varphi)dA & (5) \\ J_S \frac{d^2 \varphi}{dt^2} = -k_\varphi \varphi + \mu l_0 \int k(x_B - x_S - l\varphi)dA + \int k(x_B - x_S - l\varphi)dA & (6) \end{cases}$$

Taking the Laplace transform of these simultaneous equations gives the following characteristic equation:

$$\begin{pmatrix} m_B S^2 + k_B + kA & -kA & -k\int lA \\ -kA & m_S S^2 + k_S + kA & k\int lA \\ -kA\mu l_0 - k\int lA & -kA\mu l_0 + k\int lA & J_S S^2 + k_\varphi - k\mu l_0 \int lA + k\int l^2 aA \end{pmatrix} \begin{pmatrix} X_B \\ X_S \\ \Phi \end{pmatrix} = 0, \quad (7)$$

where S represents the Laplace operator.

In general, it is known that if the matrix in the above characteristic equation is symmetric, it indicates the system is not a self-excited oscillation system, but if any pair of elements given by switching the row and column indices have opposite signs, it indicates the system is a self-excited oscillation system. In the characteristic equation shown above, the elements related to the rotation of the brake shoe are not symmetric, and each may possibly have an opposite sign to an element given by switching the row and column indices. This indicates a possibility that self-excited oscillation of the brake shoes may be generated in the rotation direction, which causes abnormal noises.

As described above, Patent Literature 1 discloses that the brake shoes are fixed to the ring-shaped support. In such case, as the brake plate rotates, the brake shoes might rotate slightly with respect to the ring-shaped support, which causes self-excited oscillation, and thus abnormal noises.

Embodiment

In light of the mechanisms of abnormal noise production described above, an embodiment of the present invention will be described below.

Figure 3:
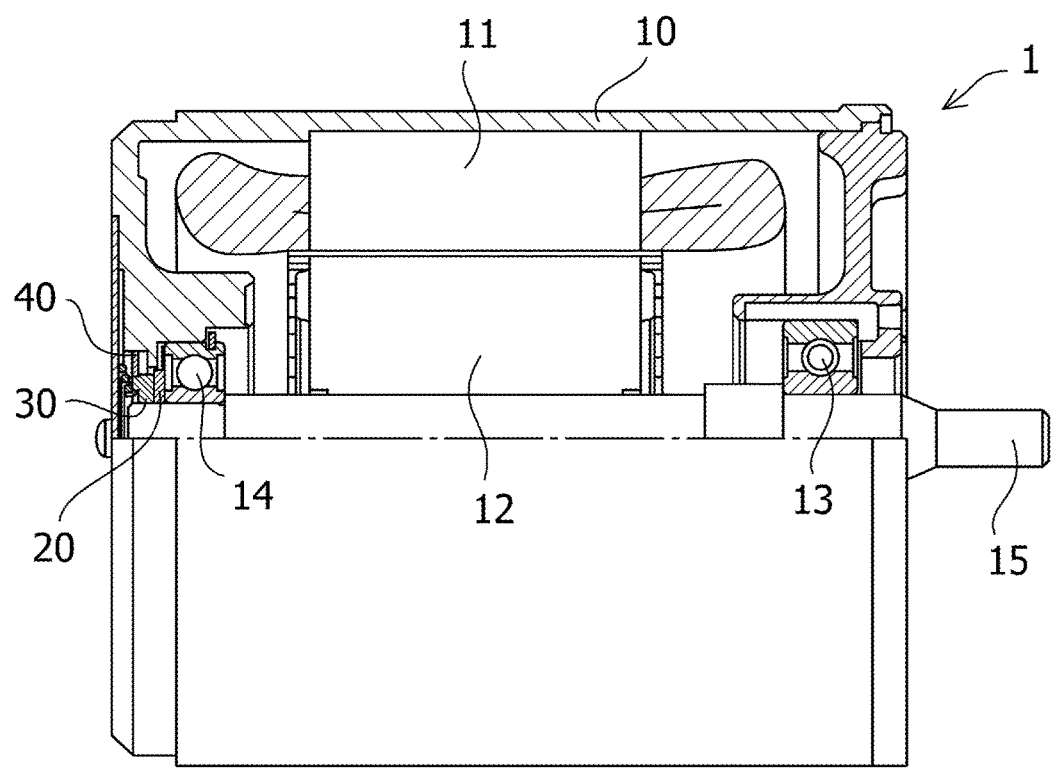
FIG. 3 is a cross-sectional view of a friction brake structure for a motor according to an embodiment of the present invention.
Figure 4:
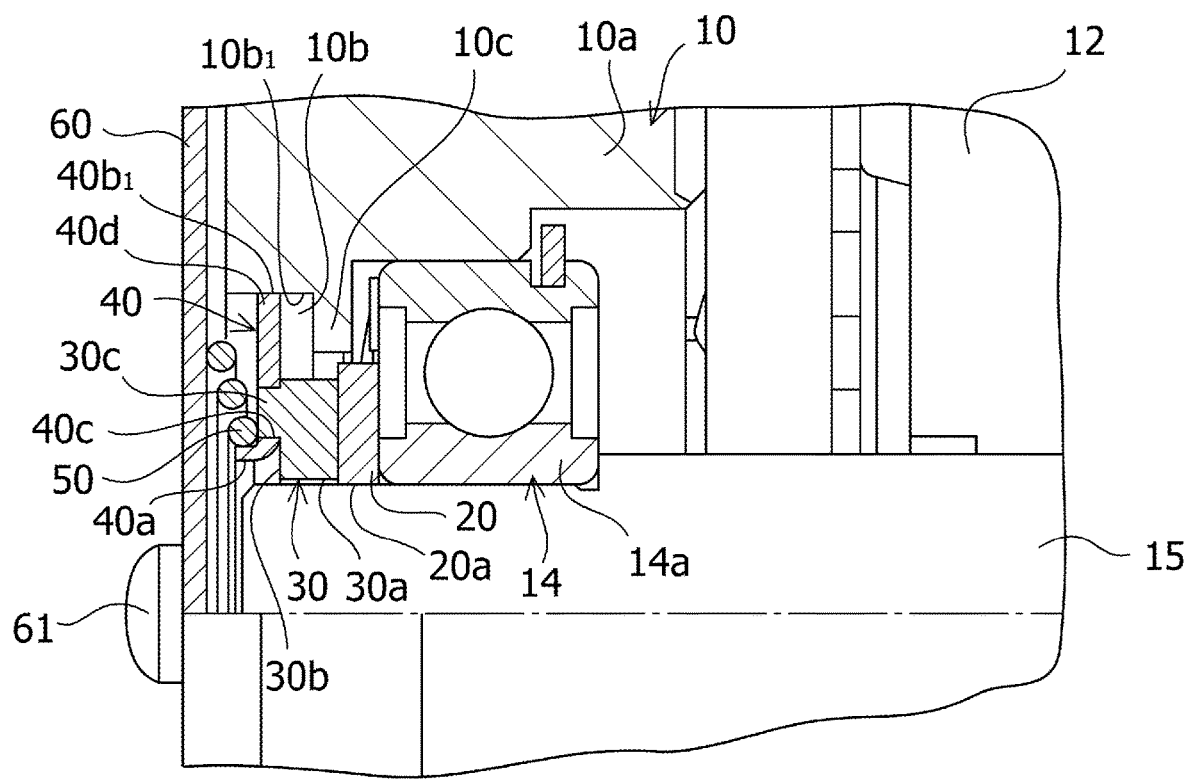
FIG. 4 is a partial enlarged view of FIG. 2.
Figure 5:
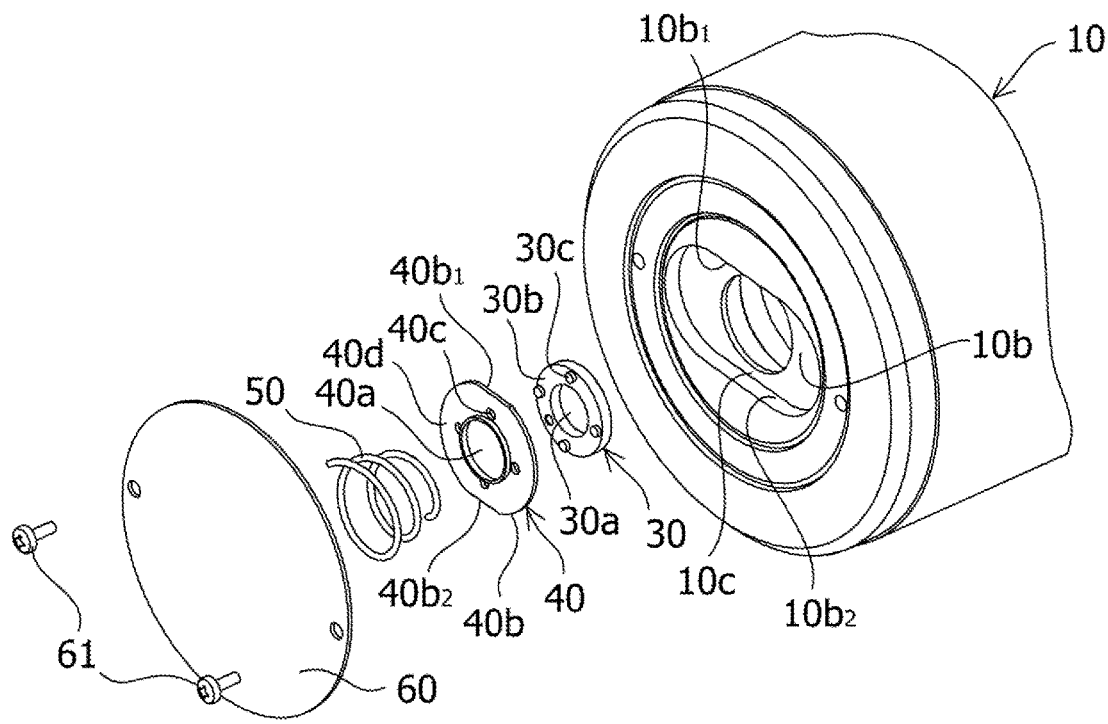
FIG. 5 is an exploded perspective view of the friction brake structure.

As shown in FIGS. 3 to 5, a motor 1 has a motor case 10, which serves as a housing. In the motor case 10, a stator 11 and a rotor 12 are provided. The rotor 12 is supported by a rotating shaft 15 supported on an output-side bearing 13 and an opposite-to-output-side bearing 14.

The opposite-to-output-side bearing 14 is mounted in a bearing housing portion 10a which is integrally provided to the motor case 10. In the bearing housing portion 10a, a hole 10b is drilled in the axial direction so as to communicate with the outside of the motor case 10. The hole 10b, which is approximately oval-shaped, has two flat surface portions $10b_1$ and $10b_2$ formed in the outer periphery so as to face each other. Thus, the hole 10b has a so-called D-cut shape.

A ring-shaped brake plate 20 is fixed to the rotating shaft 15 at a location outside the opposite-to-output-side bearing 14. The rotating shaft 15 passes through a hole 20a of the brake plate 20. In addition, the brake plate 20 is supported on an inner ring portion 14a of the opposite-to-output-side bearing 14. The outside diameter of the brake plate 20 is smaller than the outside diameter of the opposite-to-output-side bearing 14. The brake plate 20 rotates together with the rotating shaft 15.

A ring-shaped brake shoe 30 is provided so as to face the brake plate 20. The rotating shaft 15 passes through a hole 30a of the brake shoe 30. The outside diameter of the brake shoe 30 is smaller than the outside diameter of the opposite-to-output-side bearing 14. The brake shoe 30 has four protrusions 30c in an axial end surface 30b opposite to the other axial end surface being in sliding contact with the brake plate 20. The protrusions 30c are provided in the circumferential direction at even intervals. The brake shoe 30 may be made of a material, such as a PPS (polyphenylene sulfide) resin or a PTFE (polytetrafluoroethylene) resin.

The brake shoe 30 is supported by a ring-shaped brake shoe support plate 40 which is movable in the axial direction. The rotating shaft 15 passes through a first hole 40a provided at the center of the brake shoe support plate 40.

The brake shoe support plate 40 has two flat surface portions $40b_1$ and $40b_2$ formed in the outer periphery 40b so as to face each other across the first hole 40a. These two flat surface portions $40b_1$ and $40b_2$ are provided so as to engage with the two flat surface portions $10b_1$ and $10b_2$, respectively. Thus, the brake shoe support plate 40 has an approximately oval, so-called D-cut shape. The engagement of the two flat surface portions $40b_1$ and $40b_2$ of the brake shoe support plate 40 respectively with the flat surface portions $10b_1$ and $10b_2$ prevents the brake shoe support plate 40 from rotating around the rotating shaft 15 while allowing the brake shoe support plate 40 to move in the axial direction.

In addition, the brake shoe support plate 40 has four second holes 40c provided in the circumferential direction at even intervals so as to engage respectively with the four protrusions 30c. The engagement of the four second holes 40c respectively with the four protrusions 30c fixes the brake shoe 30 onto the brake shoe support plate 40.

A conical coil spring 50 is disposed on the outside axial end surface, which is opposite to the surface supporting the brake shoe 30, of the brake shoe support plate 40. The conical coil spring 50 is supported on a conical coil spring support plate 60 which is attached to the motor case 10 with screws 61. The brake shoe support plate 40 is biased by biasing action of the conical coil spring 50 so as to bring the brake shoe 30 into sliding contact with the brake plate 20.

Further, between the opposite-to-output-side bearing 14 and an outer peripheral portion 40d of the brake shoe support plate 40, a contact stop portion 10c is provided. The outer peripheral portion 40d is located radially outside the second holes 40c. The contact stop portion 10c protrudes radially inward from the inner wall of the hole 10b of the bearing housing portion 10a. The contact stop portion 10c is provided in order to restrict the movement of the brake shoe support plate 40 in the axial direction toward the brake plate 20. Such movement is to occur when the brake shoe 30 is worn by sliding contact with the brake plate 20 enough to reduce the axial thickness of the brake shoe 30 below a predetermined value.

[Operations and Effects]

As described above, the brake shoe 30 is fixed to the brake shoe support plate 40, which is prevented from rotating around the rotating shaft 15 while being allowed to move in the axial direction. Thus, while the motor 1 is driven, the brake shoe 30 is prevented from rotating along with the rotation of the rotating shaft 15 and the brake plate 20, which allows for braking the rotation of the rotating shaft 15. When the drive of the motor 1 stops, the braking force of the brake shoe 30 can quickly stop the rotation of the rotating shaft 15. In addition, while the motor stops, a certain holding force for the rotating shaft 15 is exerted. As described above, this embodiment provides braking action while the motor is driven as well as holding torque while the motor stops.

By bringing the brake shoe 30, which has a ring shape allowing securing of a sufficient sliding contact area, into sliding contact with the brake plate 20, the brake shoe 30 is prevented from rotating together with the brake plate 20. This reduces a rotational moment caused by a friction force of the brake shoe 30, and thus makes the spring constant of the coupled portion between the brake shoe 30 and the brake plate 20 less liable to change.

Here, in each of Equations (4) to (6) expressing coupled oscillation, the first term on the right side expresses a restoring force that causes simple harmonic motion, and the coefficient of this term is the so-called spring constant. The inclination angle φ is included in the second or subsequent item, which brings the same effect as changes in the spring constant in the conventional technique shown in FIG. 6.

In contrast, according to the above embodiment, by making the spring constant of the coupled portion between the brake shoe 30 and the brake plate 20 less liable to change, self-excited oscillation of the brake shoe 30 can be reduced, and thus production of abnormal noises called brake squeal can be reduced.

Such effect of reducing abnormal noise production will be described in relation to Equation (7). Note however that since it seems to be difficult to simply use Equation (7), which includes three variables, without any modifications, the determination on whether stable or not will be considered below by using a modified equation including two variables obtained by reducing the elements in Equation (7). Suppose such modified equation can be expressed as follows:

$$\begin{pmatrix} S^2 + \omega_1^2 & k_{12} \\ k_{21} & S^2 + \omega_2^2 \end{pmatrix} \begin{pmatrix} X_1 \\ X_2 \end{pmatrix} = 0. \tag{8}$$

It is known that when the product of off-diagonal elements is negative in this equation, it indicates that the system is a self-excited oscillation system.

According to the above embodiment, the ring shape of the brake shoe 30 allows the brake shoe 30 to secure a sufficient sliding contact area, and thereby to prevent or reduce the brake shoe 30 from rotating together with the brake plate 20. In other words, unlike the conventional technique shown in FIG. 6, the inclination angle φ is zero or infinitely close to zero in this embodiment. Excluding the equation of motion for the rotation of the brake shoe from Equation (7) gives the following equation:

$$\begin{pmatrix} m_B S^2 + k_B + kA & -kA \\ -kA & m_S S^2 + k_S + kA \end{pmatrix} \begin{pmatrix} X_B \\ X_S \end{pmatrix} = 0. \tag{9}$$

In Equation (9), the product of the two off-diagonal elements is positive, which indicates the system is not a self-excited oscillation system. This means that the above embodiment can reduce abnormal noise production in the brake.

In contrast, regarding the conventional technique as shown in FIG. 6, excluding $X_B$ from Equation (7) gives the following equation:

$$\begin{pmatrix} m_S S^2 + k_S + kA & -k\int IdA \\ kA\mu l_0 + k\int IdA & J_S S^2 + k_\varphi - k\mu l_0 \int IdA + k\int l^2 dA \end{pmatrix} \begin{pmatrix} X_S \\ \Phi \end{pmatrix} = 0. \tag{10}$$

According to the conventional technique, because of the presence of the inclination angle φ, the following expression:

$k\int IdA$ which is included in the off-diagonal elements can take both positive and negative values. This presents a possibility that the product of the two non-diagonal elements may be negative, indicating that the conventional technique might permit self-excited oscillation, and thus permit abnormal noise production in the brake.

Friction against the brake plate 20 gradually wears the brake shoe 30, and reduces the axial thickness of the brake shoe 30. This thickness reduction moves the brake shoe support plate 40, on which a biasing force is imposed by the conical coil spring 50, toward the brake plate 20. The brake shoe support plate 40 eventually comes into contact with the contact stop portion 10c, which restricts the further movement of the brake shoe support plate 40 toward the brake plate 20. When the brake shoe 30 is further worn, the brake shoe 30 is no longer in sliding contact with the brake plate 20. This prevents or reduces spark generation, which is expected to occur if the brake shoe 30 is in such sliding contact even after being worn to some substantial extent.

In contrast, in FIG. 6, which is not provided with the contact stop portion 10c, spark generation can be prevented or reduced by limiting the free height of the coil spring 109 such that the coil spring 109 is not compressed after the brake shoes 105 have been substantially worn. However, in such case, as the brake shoes 105 are worn, the compression height of the coil spring 109 increases, and accordingly the biasing force of the coil spring 109 decreases. This might lead to braking force reduction.

In the above embodiment, the presence of the contact stop portion 10c eliminates the need of limiting such spring free height. This makes it possible to select, as the conical coil spring 50, a spring having a free height large enough to exert a sufficient biasing force before the brake shoe support plate 40 comes into contact with the contact stop portion 10c. Thus, the above embodiment can provide a reliable braking force before the brake shoe support plate 40 comes into contact with the contact stop portion 10c.

In FIG. 6, the brake plate 104 is provided axially inside the opposite-to-output-side bearing 106b. The brake shoes 105 are disposed radially outside the opposite-to-output-side bearing 106b so as not to interfere with the opposite-to-output-side bearing 106b. As a result, the brake plate 104 has a relatively large outside diameter. In other words, the brake shoes 105 are brought into sliding contact with the brake plate 104 at relatively distant points from the axis of the rotating shaft 103. This inevitably increases the circumferential speed of the sliding contact portions to a relatively high value.

The wear volume of a brake shoe is proportional to the product PV of the contact pressure P [MPa] caused by the biasing force F of a spring and the circumferential speed V [m/s] at the sliding contact surface of the brake shoe. However, after the circumferential speed V increases to a certain value or more, the wear volume increases to a large value without being dependent on P any longer. This makes it difficult to prolong brake life in FIG. 6.

In the above embodiment, the outside diameters of the brake plate 20 and the brake shoe 30 are both smaller than the outside diameter of the opposite-to-output-side bearing 14. Thus, the sliding contact portion is relatively close to the axis of the rotating shaft 15, which suppresses an increase in the circumferential speed V at the sliding contact portion. The closer to the axis the sliding contact portion is, the larger spring biasing force F is needed to provide a desirable braking force. However, in the above embodiment, the ring shape of the brake shoe 30, which allows securing of a sufficient sliding contact area, limits the value taken by P. Therefore, the value of the product PV is reduced, and thus brake life can be prolonged.

Also, a single integrated brake shoe is provided instead of a plurality of brake shoes, and only one conical coil spring is provided as a biasing mechanism corresponding to the brake shoe. This allows for more efficient assembly.

In addition, though providing the brake structure axially outside the opposite-to-output-side bearing is considered to increase the size of the motor in the axial direction, such size increase can be limited by employing the conical coil spring.

Other Embodiments

In place of the conical coil spring 50, any biasing mechanism such as an ordinary coil spring or any resilient mechanism may be provided.

The number of the protrusions 30c is four in the above embodiment, but may be set to any number. It is only necessary to provide the second holes 40c as many as the protrusions 30c. The second holes 40c have only to be engaging portions for engaging with the protrusions 30c, and may either penetrate through the brake shoe support plate 40 from the support surface to its opposite surface, or do not penetrate to this opposite surface but instead form recesses. A still alternative configuration is also possible in which the protrusions 30c are provided to the brake shoe support plate 40 and the second holes 40c are provided to the brake shoe 30.

The brake shoe support plate 40 does not necessarily engage with the bearing housing portion 10a, which is a fixing portion provided in the motor 1 and is not expected to be moved by driving the motor 1, but may engage with another fixing portion.

The friction brake structure may also be provided to a rotary electric machine other than the motor 1.

Certain embodiments of a friction brake structure have been specifically described above. However, the present invention is not limited to such embodiments, and any modifications and alterations obvious to those skilled in the art will be all included within the technical scope of the present invention.

REFERENCE SYMBOLS LIST 1 motor
10 motor case
10a bearing housing portion
10b hole
$10b_1$ flat surface portion
$10b_2$ flat surface portion
10c contact stop portion
11 stator
12 rotor
13 output-side bearing
14 opposite-to-output-side bearing
14a inner ring portion
15 rotating shaft
20 brake plate
20a hole
30 brake shoe
30a hole
30b axial end surface
30c protrusion
40 brake shoe support plate
40a first hole
40b outer periphery
$40b_1$ flat surface portion
$40b_2$ flat surface portion
40c second hole
40d outer peripheral portion
50 conical coil spring
60 conical coil spring support plate
61 screw
100 motor case
101 stator
102 rotor
103 rotating shaft
104 brake plate
105 brake shoe
$105_1$ to $105_4$ brake shoe
105a sliding contact surface
106a output-side bearing
106b opposite-to-output-side bearing
107 bearing housing portion
108 hole
109 coil spring
110 spring retainer plate
G center of gravity
φ inclination angle
$l_0$ length
l coordinate
Q point of intersection
A1, A2, Y arrow

The invention claimed is:

1. A friction brake structure comprising:
a brake plate fixed to a rotating shaft of a rotary electric machine;
a ring-shaped brake shoe disposed facing the brake plate; and
a brake shoe support plate which engages with a fixing portion of the rotary electric machine so as to be movable in an axial direction, and which supports the brake shoe while being biased by biasing action so as to bring the brake shoe into sliding contact with the brake plate,
wherein braking action is exerted on the rotating shaft of the rotary electric machine while the rotary electric machine is driven, and holding torque is exerted on the rotating shaft of the rotary electric machine while the rotary electric machine stops.

2. The friction brake structure according to claim 1, wherein a protrusion is provided in either one of a surface of the brake shoe opposite to a sliding contact surface with the brake plate, and a support surface of the brake shoe support plate, and an engaging portion for engaging with the protrusion is provided in the other one.

3. The friction brake structure according to claim 1, wherein the brake plate is fixed to the rotating shaft at a location outside an opposite-to-output-side bearing for supporting the rotating shaft.

4. The friction brake structure according to claim 3, wherein
an outside diameter of the brake plate is smaller than an outside diameter of the opposite-to-output-side bearing, and
the brake plate is supported on an inner ring portion of the opposite-to-output-side bearing.

5. The friction brake structure according to claim 3, wherein an outside diameter of the brake shoe is smaller than an outside diameter of the opposite-to-output-side bearing.

6. The friction brake structure according to claim 1, further comprising a conical coil spring as a mechanism for applying the biasing action to the brake shoe support plate.

7. The friction brake structure according to claim 1, further comprising a contact stop portion for restricting movement of the brake shoe support plate in the axial direction toward the brake plate, the movement occurring when an axial thickness of the brake shoe reduces below a predetermined value.

* * * * *